(12) United States Patent
Urban

(10) Patent No.: US 10,081,976 B2
(45) Date of Patent: Sep. 25, 2018

(54) DOUBLE HINGED ACCESS PANEL FOR AIRCRAFT

(71) Applicant: Sikorsky Aircraft Corporation, Stratford, CT (US)

(72) Inventor: Michael R. Urban, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 240 days.

(21) Appl. No.: 14/735,309

(22) Filed: Jun. 10, 2015

(65) Prior Publication Data

US 2015/0353182 A1 Dec. 10, 2015

Related U.S. Application Data

(60) Provisional application No. 62/009,994, filed on Jun. 10, 2014.

(51) Int. Cl.
| | |
|---|---|
| *B64C 1/14* | (2006.01) |
| *E05F 15/60* | (2015.01) |
| *E05D 7/085* | (2006.01) |
| *E05D 7/083* | (2006.01) |
| *E05F 15/611* | (2015.01) |

(52) U.S. Cl.
CPC ............. *E05F 15/60* (2015.01); *B64C 1/14* (2013.01); *E05D 7/083* (2013.01); *E05D 7/085* (2013.01); *E05F 15/611* (2015.01); *E05Y 2800/102* (2013.01); *E05Y 2800/11* (2013.01); *E05Y 2800/25* (2013.01); *E05Y 2900/502* (2013.01)

(58) Field of Classification Search
CPC .. E05F 15/60; E06B 3/36; E06B 3/362; E06B 3/70; E06B 3/7003; E06B 3/7009; E06B 3/34
USPC ........................... 312/292; 244/129.4, 129.5
See application file for complete search history.

(56) References Cited

U.S. PATENT DOCUMENTS

| | | | | |
|---|---|---|---|---|
| 3,004,303 | A * | 10/1961 | Wilmer .................... | B64C 1/14 244/129.5 |
| 4,102,011 | A | 7/1978 | Clack, Jr. | |
| 5,305,969 | A * | 4/1994 | Odell .................... | B64C 1/1407 244/129.5 |
| 5,931,415 | A * | 8/1999 | Lingard ................. | B64C 1/143 244/129.4 |
| 6,317,929 | B1 | 11/2001 | Ring | |
| 6,615,898 | B2 | 9/2003 | Schulte | |
| 7,938,363 | B2 | 5/2011 | Benkart et al. | |
| 8,201,777 | B2 * | 6/2012 | Wilson ................. | B64C 1/1415 244/129.5 |

(Continued)

OTHER PUBLICATIONS

Image from a Piper aircraft PA-28, 32 , 34 built in the 1960s.*

*Primary Examiner* — Justin M Benedik
(74) *Attorney, Agent, or Firm* — Cantor Colburn LLP

(57) ABSTRACT

An access door assembly includes a door panel located at a door opening and a primary hinge having a primary hinge axis and operably connected to the door panel. A guide track is affixed at the door opening and is operably connected to the door panel to guide rotation of the door panel about the first hinge axis. A secondary hinge having a secondary hinge axis is operably connected to the door panel. The secondary hinge allows for rotation of a first portion of the door panel about the secondary hinge axis, while a second portion of the door panel is stationary.

14 Claims, 6 Drawing Sheets

(56) References Cited

U.S. PATENT DOCUMENTS 8,434,720 B2 *  5/2013  Depeige ............... B64C 1/1407
                                                244/129.5

* cited by examiner

DOUBLE HINGED ACCESS PANEL FOR AIRCRAFT

CROSS REFERENCE TO RELATED APPLICATION

This application claims priority to U.S. provisional application, 62/009,994, filed Jun. 10, 2014, the entire contents of which are incorporated herein by reference.

BACKGROUND

The subject matter disclosed herein generally relates to aircraft structures. More specifically, the subject disclosure relates to access doors for aircraft airframes.

Typical aircraft, such as rotary wing aircraft or helicopters, have one or more doors that, when opened, allow for ingress of articles or passengers into an aircraft compartment, for example, a cargo compartment or a passenger compartment. The doors may also provide for egress of passengers during normal operation of the aircraft. Aircraft further have requirements to provide for emergency egress of passengers in the case of an evacuation. Emergency egress requirements include those that the door must open outwardly, and that the door must be openable manually, without applying power via, for example, a motor.

BRIEF SUMMARY

In one embodiment, an access door assembly includes a door panel located at a door opening and a primary hinge having a primary hinge axis and operably connected to the door panel. A guide track is affixed at the door opening and is operably connected to the door panel to guide rotation of the door panel about the first hinge axis. A secondary hinge having a secondary hinge axis is operably connected to the door panel. The secondary hinge allows for rotation of a first portion of the door panel about the secondary hinge axis, while a second portion of the door panel is stationary.

Alternatively or additionally, in this or other embodiments the door assembly includes a guide pin secured to the door panel and interactive with the guide track to guide movement of the door panel.

Alternatively or additionally, in this or other embodiments the door assembly includes a drive operably connected to the door panel to drive motion of the door panel about the primary hinge axis.

Alternatively or additionally, in this or other embodiments the drive is one of an electric motor or a hydraulic motor.

Alternatively or additionally, in this or other embodiments the door assembly includes a guide stop located at the guide track to limit rotation of the door panel about the primary hinge axis.

Alternatively or additionally, in this or other embodiments the guide track is affixed to a sidewall of the door opening.

Alternatively or additionally, in this or other embodiments the secondary hinge has an operating angle of 180 degrees.

In another embodiment, an aircraft includes an airframe and an access door assembly. The access door assembly includes a door panel located at a door opening of the airframe. A primary hinge having a primary hinge axis is operably connected to the door panel. A guide track is affixed to the airframe and is operably connected to the door panel to guide rotation of the door panel about the first hinge axis. A secondary hinge having a secondary hinge axis is operably connected to the door panel. The secondary hinge allows for rotation of a first portion of the door panel about the secondary hinge axis, while a second portion of the door panel is stationary.

Alternatively or additionally, in this or other embodiments the door assembly includes a guide pin secured to the door panel and interactive with the guide track to guide movement of the door panel.

Alternatively or additionally, in this or other embodiments the door assembly includes a drive operably connected to the door panel to drive motion of the door panel about the primary hinge axis.

Alternatively or additionally, in this or other embodiments the drive is one of an electric motor or a hydraulic motor.

Alternatively or additionally, in this or other embodiments the door assembly includes a guide stop located at the guide track to limit rotation of the door panel about the primary hinge axis.

Alternatively or additionally, in this or other embodiments the guide track is affixed to a sidewall of the door opening.

Alternatively or additionally, in this or other embodiments the secondary hinge has an operating angle of 180 degrees.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
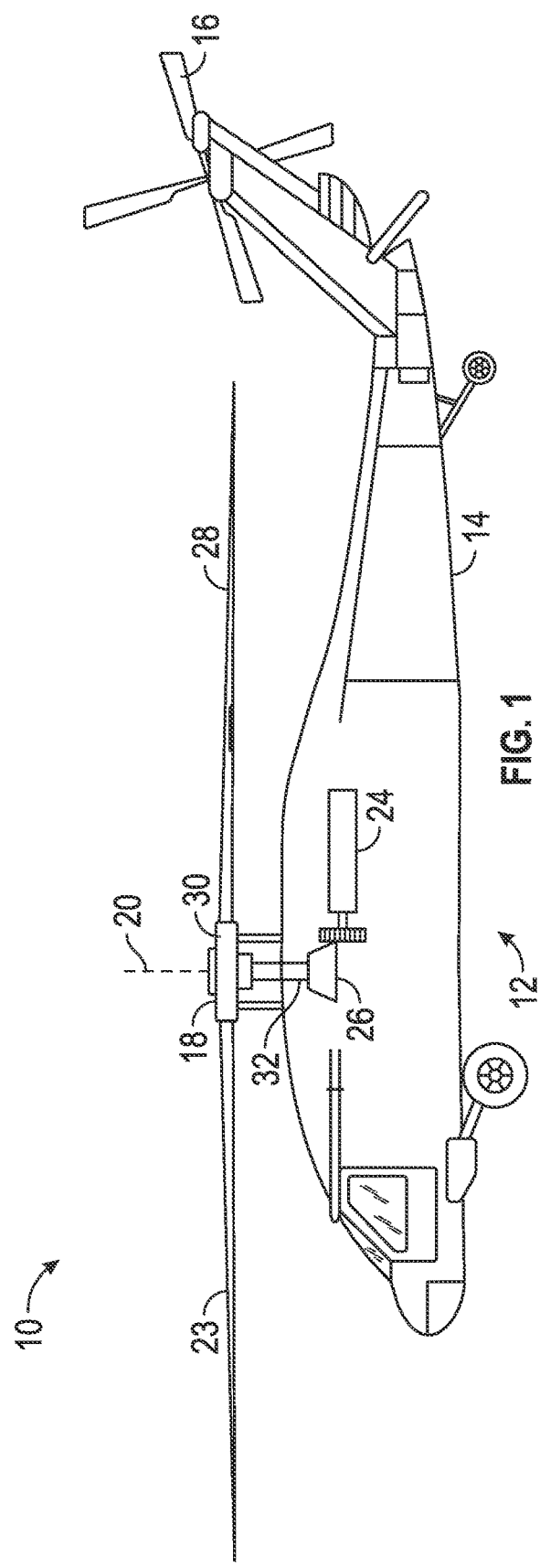
FIG. 1 is a general side view of an embodiment of a rotary wing aircraft.

Shown in FIG. 1 is a schematic view of an embodiment of a rotary wing aircraft, in this embodiment a helicopter 10. The helicopter 10 includes an airframe 12 with an extending tail 14. A main rotor assembly 18 is located at the airframe 12 and rotates about a main rotor axis 20. The main rotor assembly 18 is driven by a power source, for example, an engine 24 via a gearbox 26 about the main rotor axis 20. The main rotor assembly 18 includes a plurality of rotor blades 28 secured to a rotor hub 30, with a main rotor shaft 32 connected to the rotor hub 30 and to the gearbox 26 to transfer rotational energy from the gearbox 26 to the main rotor assembly 18. In some embodiments, the helicopter 10 further includes a tail rotor 16 located at the extending tail 14 to provide yaw control for the helicopter 10. The tail rotor 16 is connected to and driven by the engine 24 via the gearbox 26. While shown as a single rotor, it is understood that aspects of the inventions can be used in coaxial rotor-craft, tilt rotor and tilt wing aircraft, and other rotary winged aircraft. Further, while one engine 24 is shown in FIG. 1, it is to be appreciated that some embodiments may include two or more engines 24.

Figure 2:
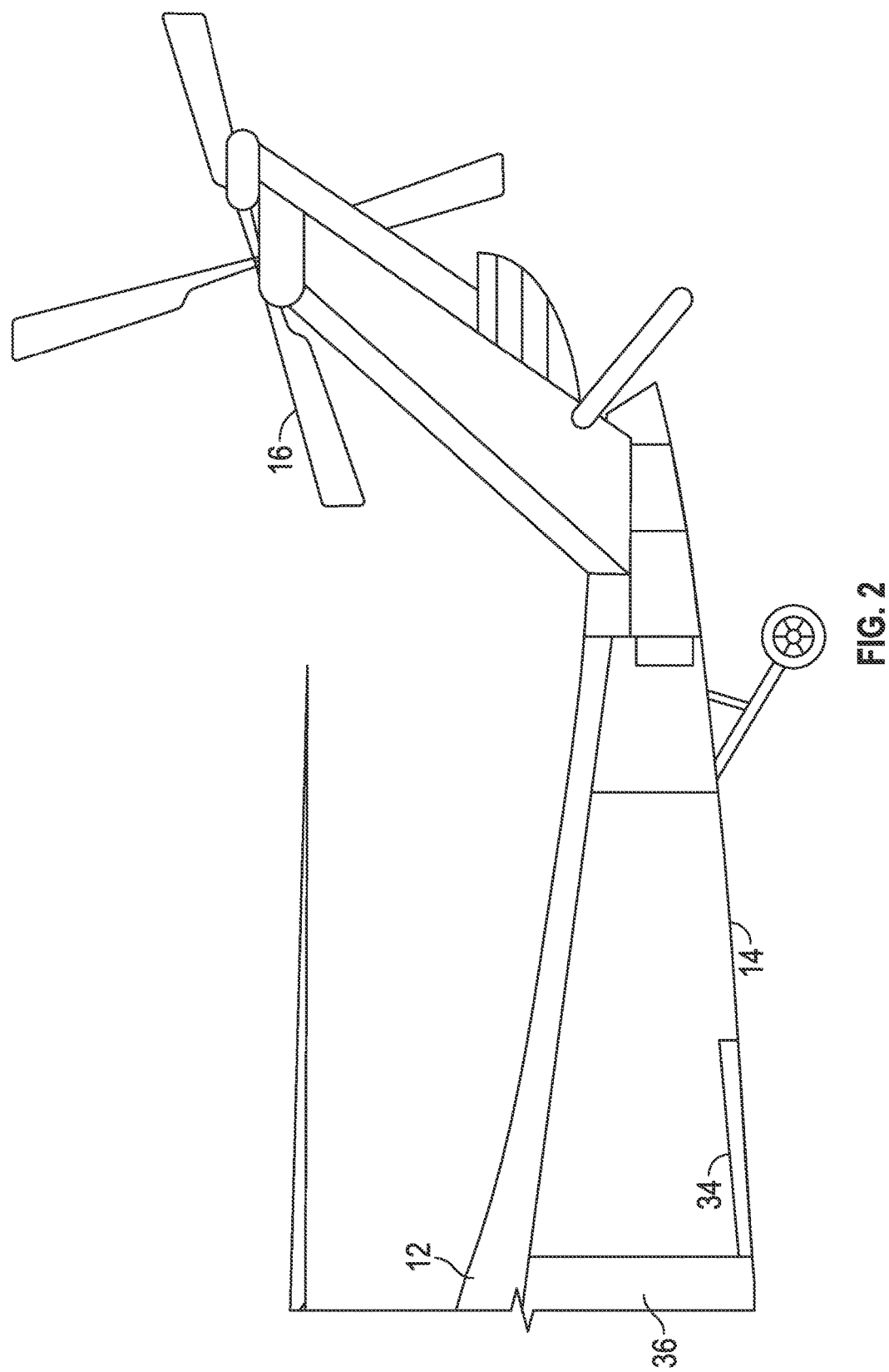
FIG. 2 is a side view of an embodiment of a rotary wing aircraft.

Referring now to FIG. 2, the helicopter 10 includes an access door 34 located in the airframe 12 for ingress and/or egress of passengers or cargo from a compartment 36 inside the airframe 12. The door 34 is, for example, an emergency egress door, and may be located at various locations on the airframe 12, such as at the extending tail 14 as shown in FIG. 2.

Figure 3:
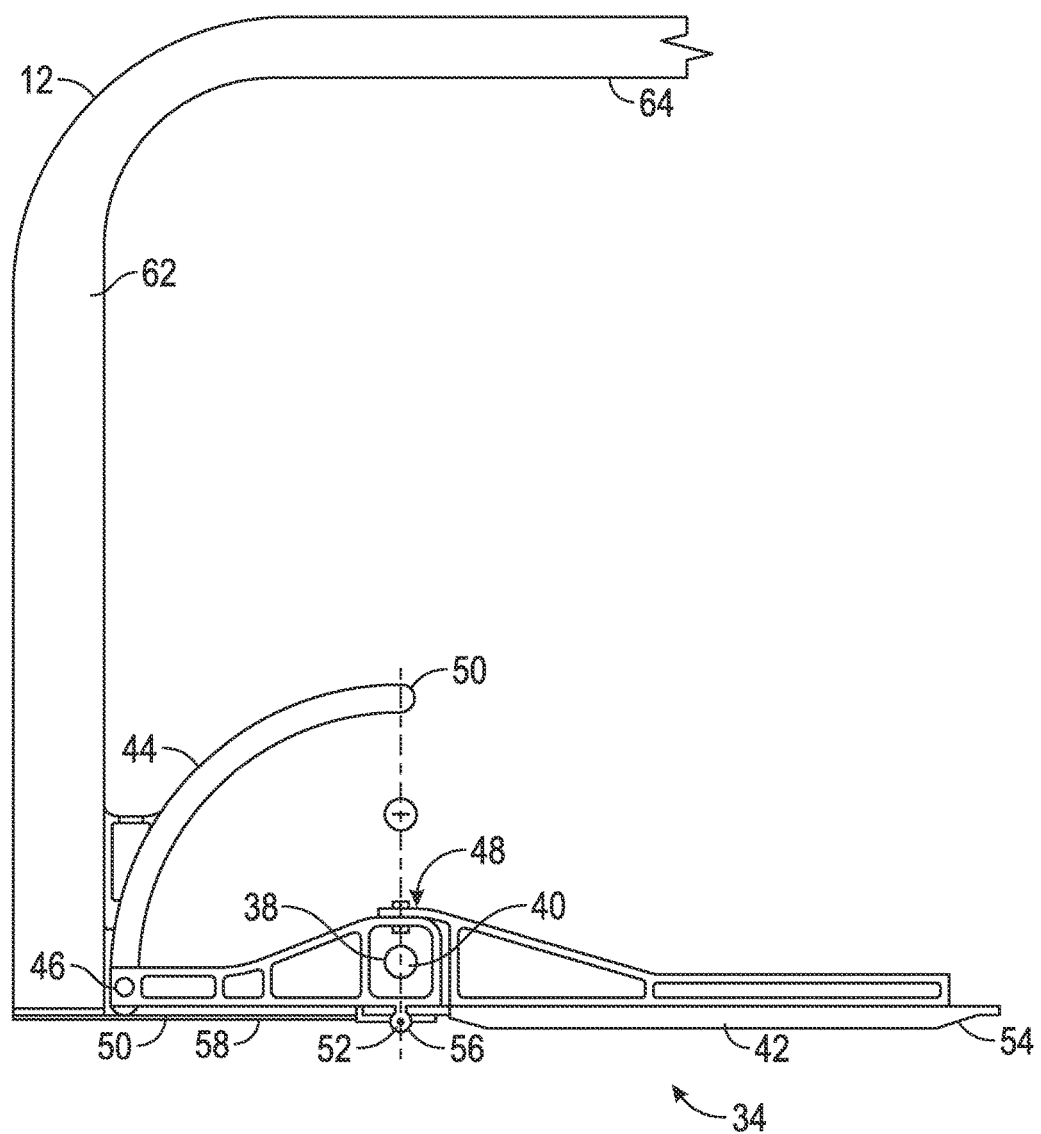
FIG. 3 is a cross-sectional view of an embodiment of an access door assembly.
Figure 4:
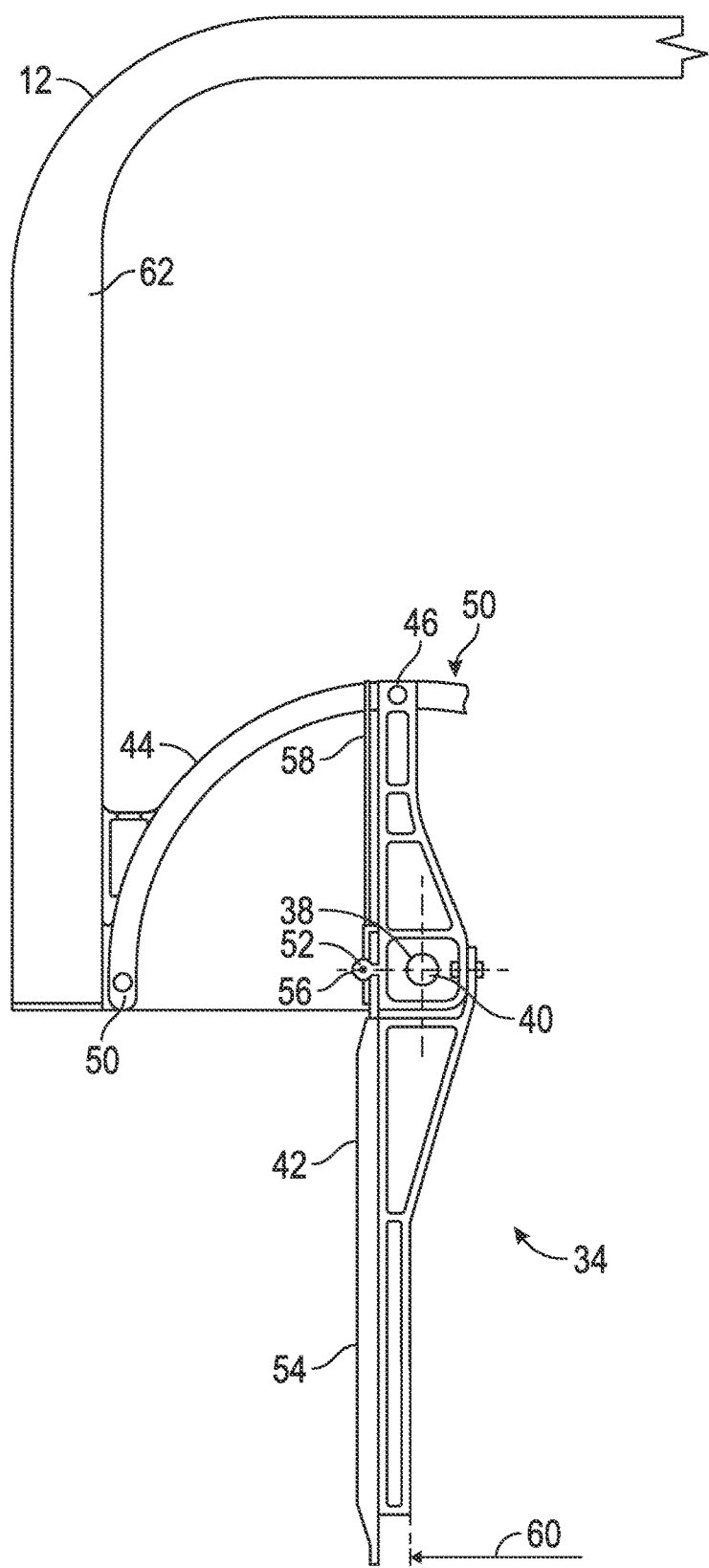
FIG. 4 is a cross-sectional view of an embodiment of an access door assembly in an open position.

Referring to FIG. 3, the door 34 opens outwardly from the airframe 12, which in some embodiments is in a downward direction. The door 34 includes a primary hinge 40 and a door panel 42 affixed to the primary hinge 40. To move between a closed position, as shown in FIG. 3, and an opened position, the door 34 rotates about a primary hinge axis 38. In some embodiments, the rotation is guided by a guide track 44 affixed to the airframe 12, with a guide pin 46 affixed to the door 34 and located in the guide track 44. In some embodiments, the guide track 44 is secured to a sidewall 62 of the airframe 12, with no interface to an upper wall 64 of the airframe 12. The guide pin 46 and/or the primary hinge 40 are operably connected to a motor 48, in some embodiments a continuous motor or stepper motor, to drive rotation of the door 34 about the primary hinge axis 38 when desired, to move the door to an opened position, as shown in FIG. 4. The motor 48 may be electrically or hydraulically operated. Further, in some conditions, the motor may be disengaged and the door 34 operated manually. In some embodiments, the guide track 44 is curvilinear, having an arc length of, for example, 90 degrees. Further, the guide track 44 includes guide stops 50 at one or more ends of the guide track 44 to stop rotation of the door 34 at the selected opened and/or closed positions. The guide stops 50 may include sensors, such as proximity sensors or the like, to sense when the guide pin reaches the opened and/or closed position. The sensed information may trigger stoppage of the motor 48 when the door 34 reaches the closed position, and may also be communicated as an access door status to an operator of the aircraft 10 via, for example a cockpit display (not shown).

Figure 5:
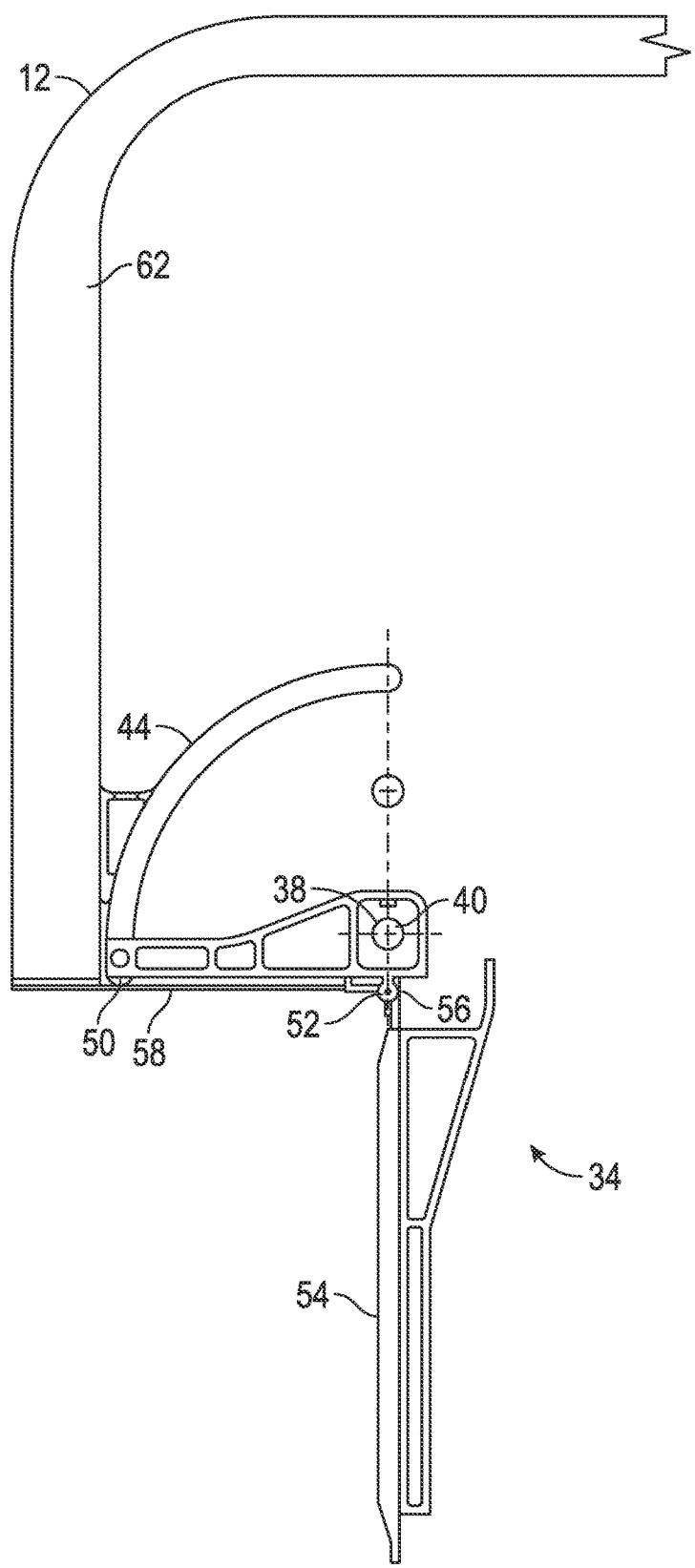
FIG. 5 is a cross-sectional view of an embodiment of an access door assembly in another open position.
Figure 6:
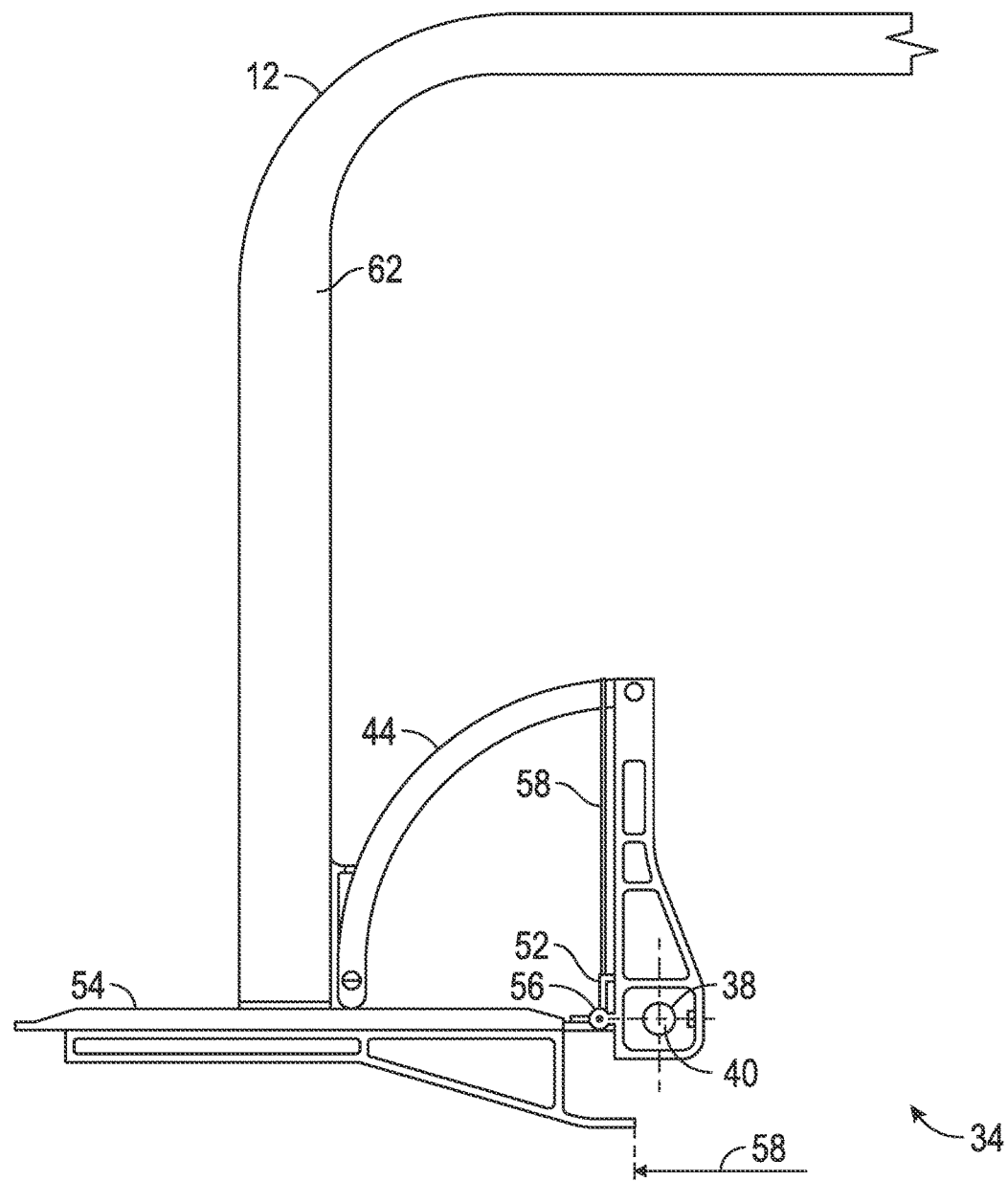
FIG. 6 is a cross-sectional view of an embodiment of an access door assembly in yet another open position.

Referring now to FIG. 5, the door 34 includes a secondary hinge 52 allowing for rotation of a first door portion 54 about a secondary hinge axis 56, to an emergency open position illustrated in FIG. 5, while a second door portion 58 remains stationary. As shown, the secondary hinge axis 56 is parallel to the primary hinge axis 38. Opening the door 34 by rotating the first door portion 54 about the primary hinge axis 56 is useful in situations such as power failure to the motor 48, jamming of the guide track 44 mechanism, or the like, such as in an emergency. Referring to FIG. 6, in some embodiments, the secondary hinge 52 has an operating angle of up to 180 degrees or more to allow for an additionally wide opening width 58 compared to a normal opening width 60 shown in FIG. 4.

Mounting the guide frame 44 to the sidewall 62 results in a compact mechanism requiring no overhead support, thus saving interior space for passengers and/or cargo. The dual hinge arrangement, reduces a moment arm and thus reduces force, either via motor or manually, required to open the door 34.

While the invention has been described in detail in connection with only a limited number of embodiments, it should be readily understood that the invention is not limited to such disclosed embodiments. For instance, while described in terms of aircraft, it is understood that aspects could be used in other contexts such as for wind turbines, maritime propulsion, or other technologies in which a rotating element's plan of rotation will vary from perpendicular with the axis of rotation of a shaft driving the rotating element. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An access door assembly comprising:
a door panel disposed at a door opening;
a primary hinge having a primary hinge axis and operably connected to the door panel;
a curvilinear guide track affixed at the door opening and operably connected to the door panel to guide rotation of the door panel about the first hinge axis; and
a secondary hinge having a secondary hinge axis and operably connected to the door panel, the secondary hinge axis being offset from and oriented parallel to the primary hinge axis, the secondary hinge allowing for rotation of a first portion of the door panel about the secondary hinge axis, while a second portion of the door panel is stationary.

2. The door assembly of claim 1, further comprising a guide pin secured to the door panel and interactive with the guide track to guide movement of the door panel.

3. The door assembly of claim 1, further comprising a drive operably connected to the door panel to drive motion of the door panel about the primary hinge axis.

4. The door assembly of claim 3, wherein the drive is one of an electric motor or a hydraulic motor.

5. The door assembly of claim 1, further comprising a guide stop disposed at the guide track to limit rotation of the door panel about the primary hinge axis.

6. The door assembly of claim 1, wherein the guide track is affixed to a sidewall of the door opening.

7. The door assembly of claim 1, wherein the secondary hinge has an operating angle of 180 degrees.

8. An aircraft comprising:
an airframe; and
an access door assembly including:
a door panel disposed at a door opening of the airframe;
a primary hinge having a primary hinge axis and operably connected to the door panel;
a curvilinear guide track affixed to the airframe and operably connected to the door panel to guide rotation of the door panel about the first hinge axis; and
a secondary hinge having a secondary hinge axis and operably connected to the door panel, the secondary hinge axis being offset from and oriented parallel to the primary hinge axis, the secondary hinge allowing for rotation of a first portion of the door panel about the secondary hinge axis, while a second portion of the door panel is stationary.

9. The aircraft of claim 8, further comprising a guide pin secured to the door panel and interactive with the guide track to guide movement of the door panel.

10. The aircraft of claim 8, further comprising a drive operably connected to the door panel to drive motion of the door panel about the primary hinge axis.

11. The aircraft of claim 10, wherein the drive is one of an electric motor or a hydraulic motor.

12. The aircraft of claim 8, further comprising a guide stop disposed at the guide track to limit rotation of the door panel about the primary hinge axis.

13. The aircraft of claim 8, wherein the guide track is affixed to a sidewall of the door opening.

14. The aircraft of claim 8, wherein the secondary hinge has an operating angle of 180 degrees.

* * * * *